(12) United States Patent
Obara et al.

(10) Patent No.: US 7,648,281 B2
(45) Date of Patent: Jan. 19, 2010

(54) FLUID DYNAMIC BEARING, MOTOR AND STORAGE DISK DEVICE

(75) Inventors: Rikuro Obara, Nagano (JP); Kyoji Kato, Nagano (JP)

(73) Assignee: Minebea Co., Ltd., Nagano (JP)

( * ) Notice: Subject to any disclaimer, the term of this patent is extended or adjusted under 35 U.S.C. 154(b) by 453 days.

(21) Appl. No.: 11/583,800

(22) Filed: Oct. 20, 2006

(65) Prior Publication Data

US 2007/0092172 A1    Apr. 26, 2007

(30) Foreign Application Priority Data

Oct. 20, 2005    (JP) .............................. 2005-306405

(51) Int. Cl.
*F16C 32/06*    (2006.01)

(52) U.S. Cl. .................. 384/107; 360/98.07; 360/98.08

(58) Field of Classification Search ................. 384/100, 384/107, 112, 114, 121, 123; 360/98.07, 360/98.08; *F16C 32/06*
See application file for complete search history.

(56) References Cited

U.S. PATENT DOCUMENTS

| | | | |
|---|---|---|---|
| 5,433,529 A * | 7/1995 | Hensel | 384/112 |
| 5,536,088 A * | 7/1996 | Cheever et al. | 384/107 |
| 5,718,516 A * | 2/1998 | Cheever et al. | 384/114 |
| 5,900,903 A * | 5/1999 | Fukita | 347/260 |
| 6,066,903 A * | 5/2000 | Ichiyama | 310/90 |
| 6,246,136 B1 * | 6/2001 | Ichiyama | 310/90 |
| 6,799,891 B2 * | 10/2004 | Kurobe et al. | 384/107 |
| 6,900,568 B2 * | 5/2005 | LeBlanc et al. | 310/90 |
| 6,991,376 B2 * | 1/2006 | Aiello et al. | 384/107 |
| 7,008,109 B2 * | 3/2006 | Gomyo et al. | 384/100 |
| 7,201,516 B2 * | 4/2007 | Haga | 384/100 |
| 7,224,552 B2 * | 5/2007 | Herndon et al. | 360/98.08 |
| 7,241,050 B2 * | 7/2007 | Uenosono et al. | 384/107 |
| 7,241,051 B2 * | 7/2007 | Grantz et al. | 384/119 |
| 7,422,371 B2 * | 9/2008 | Kennedy et al. | 384/107 |
| 2001/0014188 A1 * | 8/2001 | Sakuragi et al. | 384/100 |
| 2004/0028300 A1 * | 2/2004 | Gomyo et al. | 384/107 |
| 2006/0039634 A1 * | 2/2006 | Ichiyama | 384/100 |
| 2006/0039636 A1 * | 2/2006 | Ichiyama | 384/107 |

(Continued)

FOREIGN PATENT DOCUMENTS

JP    9-79272    3/1997

(Continued)

*Primary Examiner*—Richard W L Ridley
*Assistant Examiner*—Phillip Johnson
(74) *Attorney, Agent, or Firm*—Foley & Lardner LLP

(57) ABSTRACT

A fluid dynamic bearing is provided. A structure in which a shaft member and an annular member fitted about the shaft member are rotatably supported by a bearing member and an annular member on the bearing member has a fifth gap for storing a lubricating fluid and supplying it to a second gap below the annular member on the shaft member and a third gap around its outer periphery through a fourth gap. The fourth and fifth gaps are tapered to produce a capillary drawing force toward the third and second gaps, so that the lubricating fluid may be supplied effectively from the fifth gap to the second and third gaps. This makes it possible to suppress any sudden formation of a reduced pressure upon exposure to impact or vibration to prevent the leakage of any lubricating fluid caused by the generation of bubbles, while making up for the loss of any lubricating fluid by vaporization.

13 Claims, 8 Drawing Sheets

U.S. PATENT DOCUMENTS

| | | | |
|---|---|---|---|
| 2006/0097592 A1* | 5/2006 | Sumi | 310/90 |
| 2006/0273673 A1* | 12/2006 | Yamamura et al. | 310/90 |
| 2007/0177832 A1* | 8/2007 | Gotoh et al. | 384/107 |
| 2008/0187257 A1* | 8/2008 | Engesser et al. | 384/107 |

FOREIGN PATENT DOCUMENTS

| | | |
|---|---|---|
| JP | 2003-139131 | 5/2003 |

* cited by examiner

FLUID DYNAMIC BEARING, MOTOR AND STORAGE DISK DEVICE

FIELD OF THE INVENTION

The present invention relates to a fluid dynamic bearing which is most suitable as a bearing for a motor, such as a spindle motor, and is concerned with technology for preventing substantially any leakage of a lubricating fluid caused by vibration or impact and prolonging the life of the bearing which is shortened by the vaporization of the lubricating fluid. The present invention also relates to a motor including such a fluid dynamic bearing and a storage disk device including such a motor.

BACKGROUND OF THE INVENTION

The recent reduction in size of hard disk drives has been bringing about an increased use thereof in handy music players and various kinds of storage devices. Under these circumstances, a further reduction in size and thickness, higher bearing accuracy (accuracy in the maintenance of smooth rotation) and reliability and a prolonged life have come to be required of fluid dynamic bearings used in spindle motors for driving hard disk drives.

The leakage of a lubricating fluid (so-called oil leakage) and its vaporization exist as factors hindering the reliability and prolonged life of fluid dynamic bearings. The leakage of a lubricating fluid is, among others, serious for mobile devices which are very likely to be subjected to vibration and impact from outside.

FIG. 7A is a top plan view showing the basic construction of a fluid dynamic being known in the related art, and FIG. 7B is a cross-sectional view, partly in section of FIG. 7A. The fluid dynamic bearing 900 shown in FIGS. 7A and 7B has a bearing member 904 supporting a shaft member (rotary shaft) 901 rotatably in a housing 905, an annular portion 901a of the shaft member formed in the shape of a flange as an integral part of the shaft member 901 to hold the shaft member 901 against detachment from the bearing member 904 and an annular member 903 on the bearing member which is fitted in the housing 905 to hold down the annular portion 901a of the shaft member at its edge.

According to the construction shown, a lubricating fluid continuously fills (1) a gap between the bottom of the shaft member 901 and the housing 905, (2) a gap between the inner periphery of the bearing member 904 and the outer periphery of the shaft member 901, (3) a gap 907 between the bottom of the annular portion 901 a of the shaft member and the top of the bearing member 904 and (4) a gap 906 forming a seal between the annular member 903 on the bearing member and the annular portion 901a of the bearing member to enable the shaft member 901 to rotate smoothly out of contact with the bearing member 904. The outer periphery of the annular portion 901a of the shaft member and the inner periphery of the annular member 903 on the bearing member are so shaped as to mesh with each other and the annular member 903 on the bearing member has a portion arranged to tie on the annular portion 901a of the shaft member along its edge to hold the shaft member 901 against detachment from the bearing member 904.

If the structure is subjected to impact or vibration, the shaft member 901 repeats its tendency to move to and away tom the bearing member 904 alternately. For example, the shaft member 901 tends to move away from the bearing member 904 at a first moment and move toward it at a second moment. At the first moment, the gap 907 tends to widen, while the gap 906 partly tends to narrow. At the second moment, the gap 907 tends to narrow, while the gap 906 partly tends to widen.

It is ideal that the lubricating fluid moves between the gaps 906 and 907 fast enough in response to any sudden change in size of the gaps to enable the seal to perform its function of preventing any leakage of the lubricating fluid. More specifically, it is ideal that the lubricating fluid moves from the gap 906 to the gap 907 at the first moment, while from the gap 907 to the gap 906 at the second moment, so that the movement of the lubricating fluid may prevent any unbalance occurring to its pressure and thereby any leakage thereof effectively.

However, as the fluid dynamic bearings make a further reduction in size and thickness, and as it is more likely to be subjected to a heavier level of vibration or impact, the gaps defining the seal change their dimensions so rapidly that any smooth movement of the lubricating fluid in the seal may be difficult.

More specifically, if the shaft member 901 tends to move up relative to the annular member 903 on the bearing member at a speed above a certain level, the lubricating fluid fails to move smoothly in a timely way from that part of the gap 906 having a rapid reduction in dimensions to the gap 907 having a rapid increase in dimensions. If such is the case, the gap 907 has a reduced pressure instantaneously and the gaseous components dissolved in the lubricating fluid form bubbles in the gap 907. As the formation of bubbles is a phenomenon corresponding to the sudden formation of expanding components in the lubricating fluid, the repeated exposure to impact or vibration causes the lubricating fluid to be forced out and leak through the opening 908. Even if no bubbles may be formed, an unbalance in the pressure of the lubricating fluid makes it likely to leak.

As the annular portion 901a of the shaft member and the annular member 903 on the bearing member meshing with each other, as shown in FIGS. 7A and 7B, require the lubricating fluid to move along a bent path and thereby disable it to move rapidly, the unbalance in pressure and the formation of bubbles are particularly likely to occur as stated above. Accordingly, the leakage of the lubricating fluid is likely to occur.

Because of its construction, the fluid dynamic bearing inevitably has a portion where the surface of the lubricating fluid is exposed as shown at 908 in FIGS. 7A and 7B, and where the vaporization of the lubricating fluid occurs. The vaporization of the lubricating fluid results in a gradual reduction in the amount of the lubricating fluid which the bearing device holds. The fluid dynamic bearing finally loses its function as a bearing when it has ceased to retain the necessary amount of the lubricating fluid for maintaining its function as a bearing.

As regards the art of preventing the leakage of a lubricating fluid from a fluid dynamic bearing the disclosure of JP-A-9-79272 is, for example, known. FIG. 8 is a sectional view outlining the fluid dynamic bearing described in JP-A-9-79272. According to its arrangement, the structure in which a shaft member 21 is supported by a bearing member 22 has a lubricating fluid reservoir 28 for storing an excess of lubricating fluid to prevent the leakage of the lubricating fluid through a seal 27. According to its arrangement, the lubricating fluid reservoir 28 has an opening area smaller than that of the seal 27, so that owing to its surface tension, the fluid may have a higher surface level in the lubricating fluid reservoir 28 than in the seal 27, so that any leakage of the lubricating fluid through the seal 27 may be prevented more effectively.

However, the structure shown in FIG. 8 does not consider any function of supplying the lubricating fluid from the lubricating fluid reservoir 28 to the seal 27, since the lubricating fluid reservoir 28 has an opening area smaller than that of the seal 27 to rely on the surface tension of the fluid for keeping a higher surface level in the lubricating fluid reservoir 28 than in the seal 27. Therefore, the lubricating fluid reservoir 29 cannot be expected to prevent effectively the formation of bubbles originating from the failure of the lubricating fluid to move rapidly in the seal as stated before.

As the lubricating fluid has a higher surface level in the lubricating fluid reservoir 28 than in the seal 27, the lubricating fluid partly remains unused in the lubricating fluid reservoir 28 in the event that its surface level in the seal 27 has dropped to a level below the end of the bearing member 22 due to e.g. the evaporation or leakage of the lubricating fluid. This means that the bearing is so constructed as not to permit tie complete use of the lubricating fluid in the lubricating fluid reservoir 28, which is not desirable for prolonging the bearing life to the maximum possible extent. Thus, the structure shown in FIG. 8 has not been satisfactory in the effect of preventing the leakage of the lubricating fluid, nor has it been satisfactory in the measure against the vaporization of the lubricating fluid.

SUMMARY OF THE INVENTION

An object of an illustrative, non-limiting embodiment of the present invention is to provide technology which is highly effective for preventing the leakage of the lubricating fluid in a fluid dynamic bearing and enables it to realize a prolonged life by an effective measure against the vaporization of the lubricating fluid.

According to a first aspect of the present invention, there is provided a fluid dynamic bearing including: a shaft member; a bearing member spaced apart from the shaft member by a first gap formed therebetween; a flange formed on the shaft member and having a first large diameter portion and a first small diameter portion formed on its outer periphery and in this order toward one axial end thereof (i.e., in order from a second axial side toward a first axial side of the shaft member opposite to the second axial side); an annular member on the bearing member, the annular member being fixed to the bearing member and having a second large diameter portion and a second small diameter portion formed on its inner periphery and facing the first large diameter portion and the first small diameter portion, respectively; a second gap formed between the one end (i.e., a first axial-side end) of the bearing member and the other axial end (i.e., a second axial-side end) of the flange and communicating with the first gap; a third gap formed between the flange and the annular member on the bearing member; a fourth gap formed between the one end (i.e., the first axial side-end) of the bearing member and the other end (i.e., the second axial-side end) of the annular member on the bearing member; a fifth gap communicating with the second and third gaps through the fourth gap and faced by the outer periphery of the annular member on the bearing member; a vent between the fifth gap and the outside; and a lubricating fluid filling the first to fifth gaps continuously so as to have its surface located in the third and fifth gaps.

According to the first aspect, a flange is formed on the shaft member and has a first large diameter portion and a first small diameter portion formed on its outer periphery and in this order toward one axial end thereof, and the annular member on the bearing member has a second large diameter portion and a second small diameter portion formed on its inner periphery in their order toward one axial end thereof engageably with the first large diameter portion and the first small diameter portion, respectively, and functions as a member for retaining the flange formed on the shaft member. In other words, it realizes a retaining structure for holding the shaft member against detachment from the bearing member.

According to the first aspect, the lubricating fluid can be supplied rapidly from the fifth gap to the second and third gaps through the fourth gap. Therefore, the lubricating fluid is supplied smoothly from the fifth gap to the second and third gaps to prevent any sudden reduction in pressure in the second or third gap in the event of a strong vibration or impact acting on the bearing to widen the second or third gap suddenly. Thus, it is possible to suppress any leakage of the lubricating fluid caused by a sudden variation in pressure.

When the retaining structure described above is subjected to an axial impact or vibration, one of the gaps (the second or third gap) tends to widen. Therefore, the structure enabling a rapid supply Of the lubricating fluid from the fifth gap to the second and third gaps through the fourth gap is a useful structure for preventing the formation of bubbles resulting from any impact or vibration.

According to the first aspect, it is possible to suppress to a minimum extent any drop in the surface level of the lubricating fluid in the third gap, since the loss of any lubricating fluid from the third gap by vaporization is made up by the lubricating fluid stored in the fifth gap. Thus, the fluid dynamic bearing has a long life.

According to the first aspect, the first small and large diameter portions may be defined by a clearly distinguishable stepped structure, or alternatively by a tapered shape having a continuously varying diameter from the first small diameter portion to the first large diameter portion. The same is true with the corresponding second small and large diameter portions. The flange formed on the shaft member may be an annular portion formed as an integral part of the shaft member, or alternatively a separate annular member fitted or otherwise fixed on the shaft member.

According to the first aspect, the fifth gap preferably has a tapered shape enlarged toward one end thereof. The present feature makes it possible to realize a rapid supply of the lubricating fluid firm the fifth gap to the second or third gap by a capillary phenomenon which produces a force of drawing the lubricating fluid from the fifth gap to the second and third gaps. Its enlarged tapered shape may be a structure having its sectional size enlarged continuously or stepwise.

According to the first aspect, the fourth gap preferably has a tapered shape enlarged radially outwardly. The present feature makes it possible to realize a rapid supply of the lubricating fluid from the fifth gap to the second or third gap by a capillary phenomenon which produces in the fourth gap a force of drawing the lubricating fluid from the fifth gap to the second and third gaps. The fifth gap preferably has a larger width than the third gap. This makes a difference between a capillary force acting on the surface of the lubricating fluid in the fifth gap and that acting on the surface of the lubricating fluid in the third gap, so that the lubricating fluid may have a higher surface level in the third gap than in the fifth gap when the bearing stays in its vertical position. This configuration makes it possible to use all of the lubricating fluid stored in the fifth gap to feed the third gap even when the vaporization of the lubricating fluid from the third gap gradually proceeds. This is an important point in pursuing a fluid dynamic bearing having a prolonged life.

According to the first aspect, the annular member on the bearing member preferably has a third large diameter portion and a third small diameter portion, the third large diameter portion being fitted on the inner periphery of a bottomed cylindrical structure including the bearing member, while the third small diameter portion has an outer periphery forming with the inner periphery of the bottomed cylindrical structure facing the outer periphery of the third small diameter portion a gap defining the fifth gap. The present feature enables the fifth gap to be annular for supplying the lubricating fluid to the second and third gaps uniformly in every radial direction. The annular member on the bearing member and the inner periphery of the bottomed cylindrical structure define therebetween an annular space which provides a lubricating fluid reservoir to store a large supply of the lubricating fluid. Therefore, the bearing has a still longer life. The bottomed cylindrical structure is a cylindrical structure having one end closed by a bottom. The bottom may be formed as an integral part of the cylindrical portion, or may be a separate member fitted or otherwise attached to the cylindrical portion. The bearing member, which is situated within the bottomed cylindrical structure, may be formed as an integral part of the bottomed cylindrical structure, or may be a cylindrical bearing member fitted within the bottomed cylindrical structure.

The third large diameter portion is preferably so constructed as to have at least one slot or through-hole formed as the vent. The present feature makes it possible to form a vent having a relatively small open area as compared with the reservoir having a large capacity in the fifth gap to thereby lower the rate of vaporization of the lubricating fluid and prolong the life of the bearing.

According to the first aspect, the vent formed in the fifth gap can be employed for filling it with the lubricating fluid. After filling is completed, a scaling member preferably is placed to cover the vent. The sealing member has a through-hole with an open area smaller than that of the vent and the through-hole enables the fifth gap to communicate with the outside. The present aspect facilitates the filling of the fifth gap with the lubricating fluid and the control of its amount and surface level, as the fluid surface is visible. Moreover, the closing of the vent after filling the fifth gap with the lubricating fluid except for a small through-hole just sufficient to permit ventilation for air release, makes it possible to prevent the leakage and vaporization of the lubricating fluid from the fifth gap more effectively, while ensuring the ventilation of the fifth gap and enabling a smooth supply of the lubricating fluid from the fifth gap to the second and third gaps.

The third gap preferably has an opening around which the bearing is coated with an oil repellent. In addition, the bearing is preferably coated with an oil repellent around the vent formed in the fifth gap and/or the through-hole formed in the sealing member. The present aspect provides an oil repellent surface in the vicinity of the portion where the fluid surface is exposed to the open air and thereby realize a structure preventing the outward leakage of the lubricating fluid through the opening of the third gap (the portion where the fluid surface is exposed to the open air) or through the vent.

According to a second aspect of the present invention, there is provided a motor including a fluid dynamic bearing having any of the structural features as described above (or a combination thereof). The motor according to the second aspect of the invention provides a motor including a bearing which is strong against impact and vibration, and has a long life. The motor is preferably a spindle motor. While the leakage of a lubricating fluid from the bearing portion of a spindle motor for a mobile device is a large factor detrimental to its reliability and life as it is supposed to be used in a condition in which it is easily affected by impact or vibration, the second aspect of the invention provides a spindle motor which is strong against impact and vibration and has a long life, since it includes a bearing having the advantages owned by the first aspect of the invention as described before.

According to a third aspect of the present invention, there is provided a storage disk device comprising a motor according to the second aspect of the present invention, a storage disk medium rotated by the motor and a head for writing information in the storage disk medium and/or reading it. The third aspect of the invention provides a storage disk device including a motor which is strong against impact and vibration, and has a long life. The storage disk medium may, for example, be a hard disk (magnetic disk), an optical disk or a magneto-optical disk. Accordingly, the storage disk device may be a magnetic disk storage device such as a hard disk drive, an optical disk storage device such as a CD or DVD drive, or a magneto-optical disk storage device. The storage disk device to which the third aspect of the present invention is applicable may be of the read-only type, or of the writable type.

BRIEF DESCRIPTION OF THE DRAWINGS

The features of the invention will appear more fully won consideration of the exemplary embodiment of the invention, which are schematically set forth in the drawings, in which.

DETAILED DESCRIPTION OF THE EXEMPLARY EMBODIMENTS

Although the present invention will be described below with reference to the exemplary embodiments thereof, the following exemplary embodiments and modifications do not restrict the invention.

According to a first aspect of the present invention, the reservoir formed separately from the gap between the shaft and bearing members for supplying the lubricating fluid into that gap in the bearing including a retaining structure for holding the shaft member against detachment from the bearing member makes it possible to supply the lubricating fluid from the reservoir to the gap between the shaft and bearing members to suppress the formation of bubbles in the lubricating fluid subjected to vibration or impact and thereby prevent its leakage. Even if any lubricating fluid may vaporize from the gap between the shaft and bearing members, the vaporized fluid is made up by the fluid supplied from the reservoir, so that the beating may have a long life.

As the vent is formed to maintain the pressure acting on the surface of the fluid in the reservoir at an atmospheric pressure, and as a larger capillary force acts on the surface of the fluid in the seal than in the reservoir so that the fluid may have a higher surface level in the seal than in the reservoir, it is possible to obtain a structure enabling a quick and reliable supply of the lubricating fluid to the gap between the shaft and bearing members. This makes it possible to suppress the formation of bubbles in the lubricating fluid subjected to vibration or impact more effectively and thereby prevent its leakage more effectively. As the lubricating fluid can be supplied from the reservoir to the seal effectively, any lubricating fluid lost by vaporization from the seal can be made up effectively by the reservoir, so that the fluid dynamic bearing may have a long life.

A second aspect of the invention makes it possible to obtain a motor which is strong against impact and vibration and has a long life, by employing a fluid dynamic bearing having the advantages of the first aspect of the invention. A third aspect of the invention makes it possible to obtain a storage disk device which is strong against impact and vibration and has a long life.

(1) First Embodiment (Structural Features of the First Embodiment)

Figure 1A:
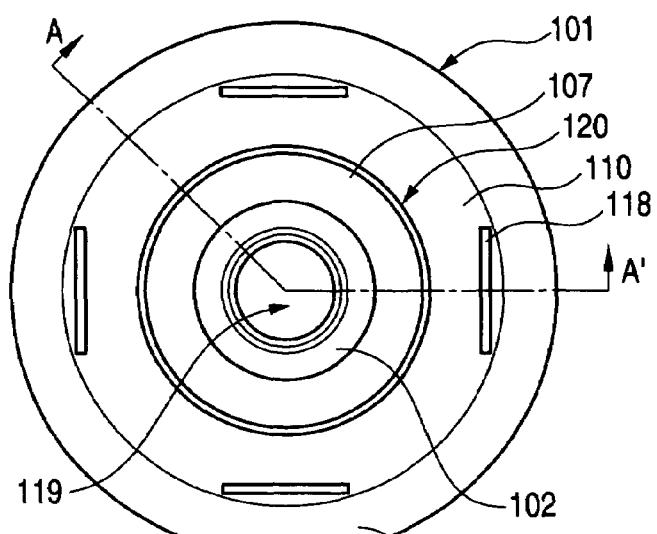
FIG. 1A is a top plan view showing a fluid dynamic bearing according to a first exemplary embodiment of the present invention.
Figure 1B:
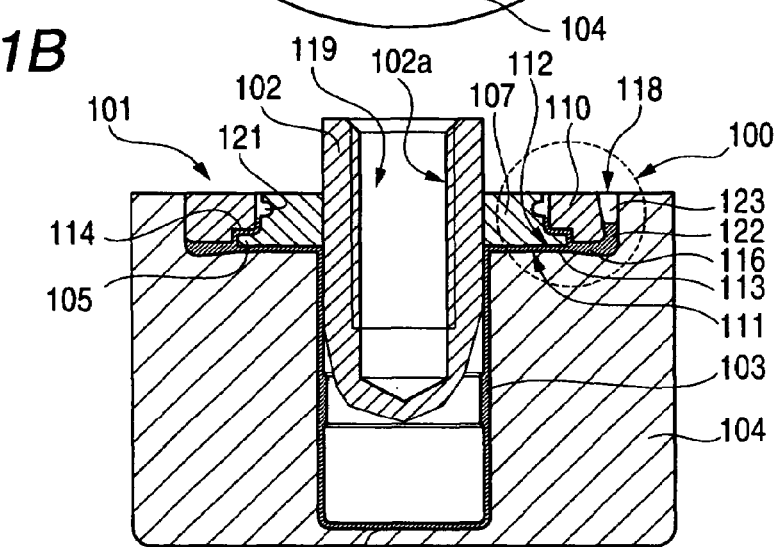
FIG. 1B is a cross-sectional view along the line A-A' of FIG. 1A.
Figure 1C:
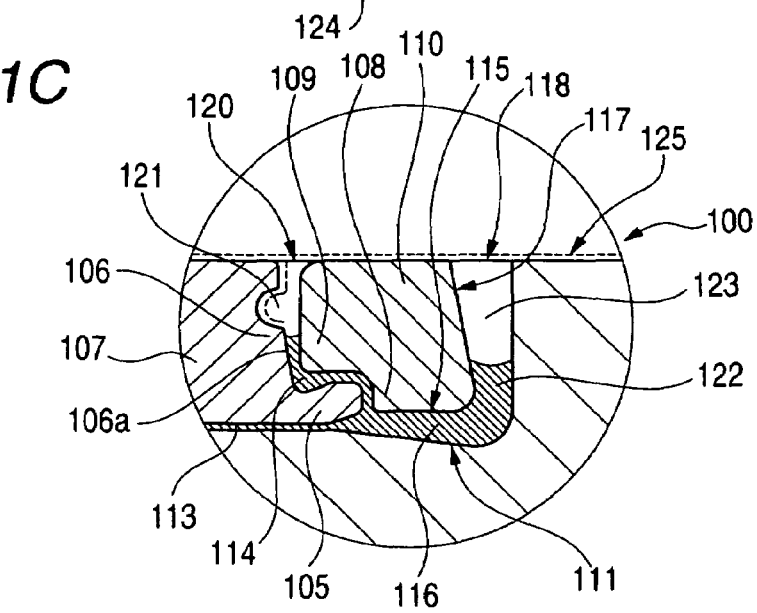
FIG. 1C is an enlarged view of the seal portion.

FIG. 1A is a top plan view outlining a fluid dynamic bearing embodying an exemplary embodiment of the present invention, FIG. 1B is a cross-sectional view as taken along the line A-A' of FIG. 1A, and FIG. 1C is an enlarged view (as denoted by symbol 100). The fluid dynamic bearing 101 shown in FIGS. 1A-1C has a shaft member 102 (rotary shaft), a bearing member 104 spaced apart from the outer periphery of the shaft member 102 by a first gap 103, an annular member 107 on the shaft member which is fitted on the shaft member 102 and has a first large diameter portion 105 and a first small diameter portion 106 formed on its outer periphery in this order toward one axial end thereof (toward the top in FIG. 1B) and an annular member 110 on the bearing member which is fitted in the bearing member 104 and has a second large diameter portion 108 and a second small diameter portion 109 formed on its inner periphery and facing the first large diameter portion 105 and the first small diameter portion 106, respectively.

The fluid dynamic bearing 101 also has a second gap 113 formed between the end surface 111 of the bearing member 104 at one end thereof (at the top side end in FIG. 1B) and the end surface 112 of the annular member 107 on the shaft member at the other axial end thereof (at the bottom side end in FIG. 1B), a third gap 114 formed between the annular member 107 on the shaft member and the annular member 110 on the bearing member, having a cross sectional shape substantially like that of a crank (having a vertical portion, a horizontal portion and a vertical portion in this order) and serving as a seal and a fourth gap 116 formed between the end surface 111 of the bearing member 104 at one end thereof and the end surface 115 of the annular member 110 on the bearing member at the other end thereof. The vertical portion of the third gap 114 near its opening (the wall surface 106a of the first small diameter portion 106) has a tapered shape defining an outwardly enlarged cross section to function as a capillary seal based on a capillary phenomenon. The vertical portion of the third gap 114 near its opening functions as a labyrinth seal with its horizontal portion contiguous thereto and another vertical portion. Thus, the third gap 114 forms an effective seal having two functions.

The annular member 110 on the bearing member in the fluid dynamic bearing 101 has an outer periphery 17 facing the fifth gap 123 with which the second and third gaps 113 and 114 are connected through the fourth gap 116, and above which a vent 118 is formed to ensure ventilation from outside. The first gap 103, second gap 113, third gap 114, fourth gap 116 and fifth gap 123 are continuously filled with a lubricating fluid 122 (as shown in solid black in FIG. 1B). A sixth gap 124 is formed between the other end of the shaft member 102 and the inner bottom surface of the bearing member 104 (the bottom of its central hole) facing it and is continuously filled with the lubricating fluid. The fifth gap 123 is greater in width than the third gap 114, so that there may be a difference between the capillary forces acting on the surfaces of the fluid in the two gaps. Accordingly, the fluid has a higher surface level in the third gap 114 than in the fifth gap 123. Thus, the shaft assembly composed of the shaft member 102 and the annular member 107 on the shaft member is rotatably supported on the bearing assembly composed of the bearing member 104 and the annular member 110 on the bearing member by the lubricating fluid filling the minute gaps.

The shaft member 102 has a screw hole 119 formed in the center of one end thereof (at the top side end in FIG. 1B) for connecting a rotary member (for example, a rotor for supporting a hard disk in a hard disk drive) to the shaft member 102 threadedly.

The annular member 107 on the shaft member is fitted tightly about the shaft member 102 and has a step formed between its first large diameter portion 105 and its first small diameter portion 106. The annular member 110 on the bearing member is fitted tightly on the inner periphery of the bearing member 104 and has four notches formed in its outer periphery and each defining a vent 118 and a fifth gap 123. The annular member 110 on the bearing member has a step formed between its second large diameter portion 108 and its second small diameter portion 109. The step formed by the first large and small diameter portions 105 and 106 on the outer periphery of the annular member 107 on the shaft member and the step formed by the second large and small diameter portions 108 and 109 on the inner periphery of the annular member 110 on the bearing member face each other engageably and are spaced apart by a minute gap (the third gap 114), whereby the gap passage substantially in the shape of a crank as described before is formed to function as a labyrinth seal, while the shaft member 102 is held against detachment at one end thereof (at the top side end in FIG. 1B).

A radial dynamic pressure groove for generating a dynamic pressure to support a radial load is formed in the inner periphery of the bearing member 104 facing the first gap 103. The radial dynamic pressure grove may alternatively be formed in the outer periphery of the shaft member 102. An axial dynamic pressure groove for generating, a dynamic pressure subjected to an axial load is formed in the surface 112 of the annular member 107 on the shaft member at the other end thereof. The axial dynamic pressure grove may alternatively be formed in the surface 111 of the bearing member 104 at one end thereof.

The outer periphery 117 defining the fifth gap 123 is axially inclined to define for the fifth gap 123 a cross section so tapered as to be enlarged toward one end thereof (toward the top in FIG. 1B). Accordingly, the fifth gap 123 is so shaped as to widen continuously toward its top. Its construction as described causes a capillary phenomenon to produce a downward drawing force on the lubricating fluid in the fifth gap 123, so that the fifth gap 123 may function as a capillary seal to prevent the leakage of any lubricating fluid through the vent 118. The drawing force also facilitates the movement of the lubricating fluid from the fifth gap 123 to the second and third gaps 113 and 114 through the fourth gap 116.

The upper and lower wall surfaces defining the fourth gap 116 are so tapered that it may be enlarged radially outwardly (as viewed radially from the axis of rotation). Accordingly, the fourth gap 116 is so formed as to widen continuously and gradually as viewed radially from the axis of rotation. Thus, a capillary phenomenon produces in the fourth gap 116 a drawing force acting toward the central of the axis to facilitate the movement of the lubricating fluid from the fifth gap 117 to the second and third gaps 113 and 114. The fourth gap 116 is annular as viewed from above and serves as a lubricating fluid supply passage along its entire circumference. Moreover, the fourth gap 116 is also capable of holding a large amount of lubricating fluid and functions as a lubricating fluid reservoir.

This structure enables an efficient supply of the lubricating fluid from the fifth gap 123 serving as a lubricating fluid reservoir to the second and third gaps 113 and 114 through the fourth gap 116, since both of the fourth and fifth gaps 116 and 123 have a tapered shape in cross section to produce a drawing force directed toward the second and third gaps 113 and 114.

A holdback cavity 121 for receiving any splashing lubricating fluid is formed above the third gap 114 and a gap opening 120 is defined above it by a small gap through which the third gap is open to the outside. Even if any impact or vibration may have caused the lubricating fluid in the third gap 114 to move toward the gap opening 120 and have its surface level raised, or splash, it hits the inner wall of the holdback cavity 121, drops and is recovered. This makes it possible to suppress any leakage of the lubricating fluid through the gap opening 120.

The bearing is coated with an oil repellent 125 repelling the lubricating fluid on its surface around the vent 118 and the gap opening 120 and on its surface inside the holdback cavity 121 Accordingly, any lubricating fluid tending to leak through the vent 118 or the gap opening 120 is repelled by the surface surrounding any such opening, so that its leakage may hardly occur. The oil repellent coating the inner surface of the holdback cavity 121 facilitates the dropping of any lubricating fluid hitting the inner wall of the holdback cavity 121 and thereby makes the holdback cavity 121 more effective for preventing any leakage. It is also effective to coat the surfaces just inwardly of the vent 118 and/or the gap opening 120 with the oil repellent. Any lubricating fluid tending to leak through the vent 118 or the gap opening 120 is repelled just inwardly of any such opening, so that its leakage may not occur.

(Advantages of the First Embodiment)

The fluid dynamic bearing shown in FIGS. 1A-1C as an example enables a quick supply of the lubricating fluid to the second gap 113 and the third gap 114 serving as a seal, since a drawing force acts from the fifth gap 123 serving as a lubricating fluid reservoir to the fourth gap 116 serving as a lubricating fluid supply passage and also from the fourth gap 116 to the second and third gaps 113 and 114, Accordingly, it is possible to realize a quick supply of the lubricating fluid to the second or third gap 113 or 114 in response to any sudden increase in width thereof as caused by impact or vibration. Thus, it is possible to suppress any sudden generation of a reduced pressure and any formation of bubbles caused by the generation of a reduced pressure.

As a larger capillary force is produced in a gap having a smaller width, the fifth gap 123 is formed with a larger width than the third gap 114 so that a capillary force acting on the surface of the fluid may differ from one gap to the other to allow the lubricating fluid to have a higher surface level in the third gap 114 than in the fifth gap 123. Accordingly, any loss of the lubricating fluid by vaporization from the third gap 114 can be made up by the lubricating fluid in the fifth gap 123 until all of the fluid in the fifth gap 123 is used effectively, and a prolonged bearing life can, thus, be achieved.

As the vent 118 is formed for the fifth gap 123 to secure a route for the movement of air from outside, it is possible to realize a smooth movement of the lubricating fluid from the fifth gap 123 to the fourth gap 116 and from the fourth gap 116 to the second and third gaps 113 and 114 as described above.

As the fourth gap 116 extends radially from the shaft member 102 and is connected to the fifth gap 123 extending upwardly (or axially), a limited space is utilized effectively to form a reservoir having a large volume as a source of supply of the lubricating fluid. This arrangement makes it possible to increase the storage of the lubricating fluid without increasing the axial length of the seal and thereby realize a prolonged bearing life without the sacrifice of its function when a small bearing is desired.

When the fluid dynamic bearing is assembled, it is possible to supply the lubricating fluid through the vent 118 and control the amount of the lubricating fluid filling the bearing reliably and easily, since the surface level of the lubricating fluid in the bearing is visually ascertainable. The vent 118 through which the surface level of the lubricating fluid is easily visible facilitates the job of filling the bearing with the lubricating fluid and is beneficial for quality control.

(Modification of the First Embodiment)

The structure shown in FIGS. 1A-1C may be so modified as to have a single unitary flanged shaft member which is obtained by forming the annular member 107 on the shaft member as an integral part of the shaft member 102. The number of the vents 118 formed by notches is not limited to four. A larger number of vents 118 enables a still more effective supply of the lubricating fluid.

2. Second Embodiment

Figure 2A:
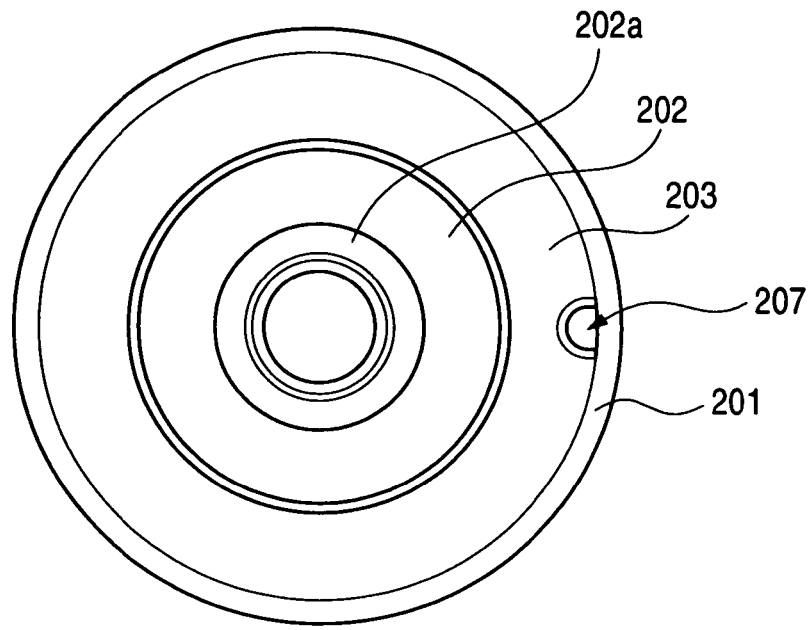
FIG. 2A is a top plan view and FIG. 2B is a cross-sectional view showing a fluid dynamic bearing according to a second exemplary embodiment of the present invention.
Figure 2B:
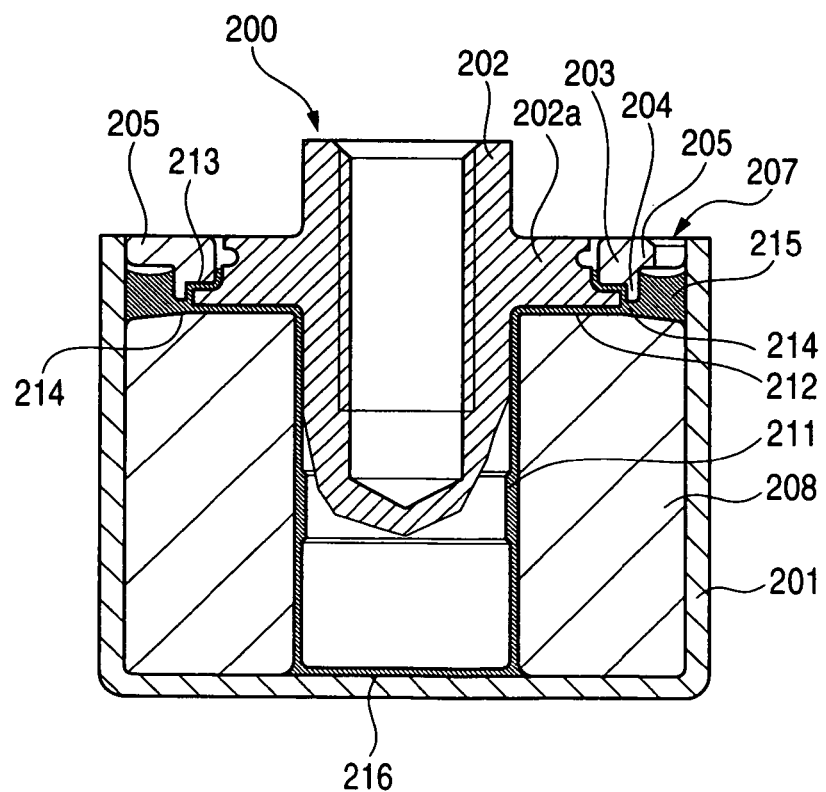

FIG. 2A is a top plan view showing another form of fluid dynamic bearing embodying an exemplary embodiment of the present invention, and FIG. 2B is a cross-sectional view corresponding to FIG. 2A. The fluid dynamic bearing 200 shown in FIG. 2 has a bearing member 208 fitted on the inner periphery of a bottomed cylindrical housing 201 and supporting a shaft member (rotary shaft) 202. An annular member 203 on the bearing member is also fitted on the inner periphery of the housing 201. The shaft member 202 has an annular portion 202a formed as an integral part thereof.

The annular member 203 on the bearing member has a large diameter portion 205 formed adjacent to one axial end thereof (or its upper end) and a small diameter portion 204 formed adjacent to the other axial end thereof (or its lower end). The large diameter portion 205 is fitted on the inner periphery of the housing 201, whereby the annular member 203 on the bearing member is indirectly secured to the bearing member 208.

The structure shown in FIGS. 2A-2B has a first gap 211 formed between the outer periphery of the shaft member 202 and the inner periphery of the bearing member 208, a second gap 212 formed between the other (or lower) end of the annular portion 202a of the shaft member and one (or the upper) end of the bearing member 208, a bent third gap 213 formed between the annular portion 202a of the shaft member and annular member 203 on the bearing member, a fourth gap 214 formed between the other (or lower) end of the small diameter portion 204 of the annular member 203 on the bearing member and one (or the upper) end of the bearing member 208 and a fifth gap 215 formed between the outer periphery of the small diameter portion 204 of the annular member 203 on the bearing member and the inner periphery of the housing 201. A sixth gap 216 is formed between the end of the shaft member 202 and the bottom of the housing 201. The first to sixth gaps 211 to 216 are continuously filled with a lubricating fluid.

The first, second and third gaps 211, 212 and 213 correspond respectively to the first, second and third gaps 103, 113 and 114 shown in FIGS. 1A-1C. The fourth and fifth gaps 214 and 215 have an annular three-dimensional shape which is coaxial with the shaft member 202. This is a structure which is beneficial for prolonging the life of the fluid dynamic bearing, since it enables the storage of a still larger amount of lubricating fluid in the reservoir and thereby a still smoother supply of the lubricating fluid.

The annular member 203 on the bearing member has a vent 207 formed by a notch in its large diameter portion 205 to ensure ventilation between the fifth gap 215 and its exterior. As only one vent 207 is formed and its opening area is small as compared with the volume of the fifth gap 215, it is possible to suppress any loss of the lubricating fluid by leakage or vaporization, while ensuring ventilation.

The fourth gap 214 is smaller in width than the fifth gap 215, and the second and third gaps 212 and 213 are smaller than the fourth gap 214. Accordingly, a capillary drawing force acts from the fifth gap 215 to the fourth gap 214 and from the fourth gap 214 to the second and third gaps 213 to promote the supply of the lubricating fluid from the gap 215 to the second and third gaps 212 and 213.

Figure 3A:
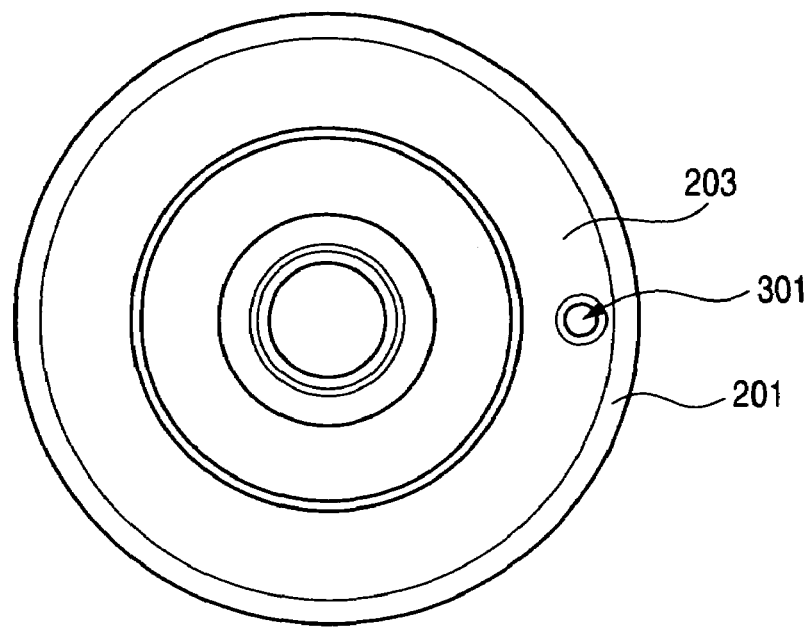
FIG. 3A is a top plan view and FIG. 3B is a cross-sectional view showing a modified form of the fluid dynamic bearing according to the second exemplary embodiment of the present invention.
Figure 3B:
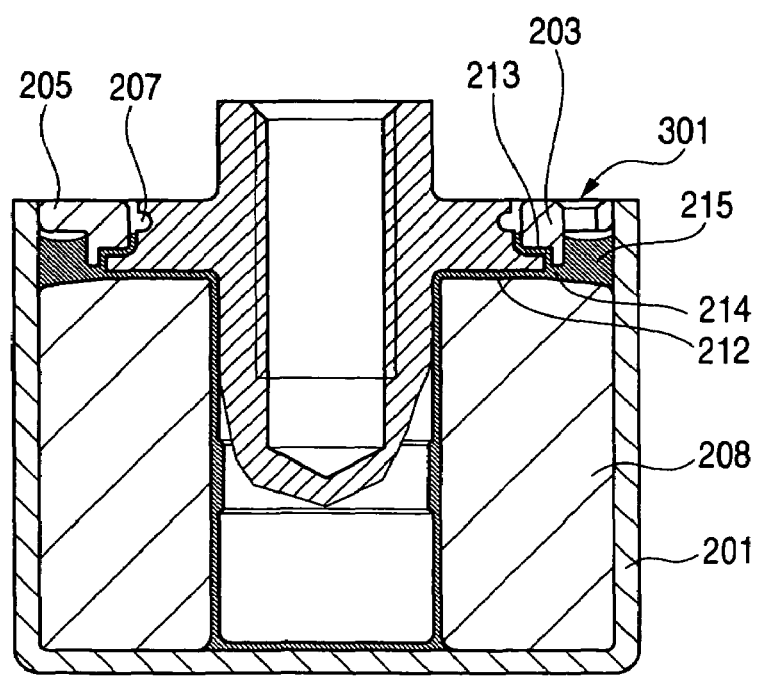

The vent 207 formed by a notch according to the present embodiment may alternatively be formed by a through-hole, FIG. 3A is a top plan view showing another example of fluid dynamic bearing embodying an exemplary embodiment of the present invention, and FIG. 3B is a cross-sectional view corresponding to FIG. 3A. FIGS. 3A-3B show a structure obtained by forming a through-hole 301 instead of the notch in the large diameter portion 205 of the annular member 203 on the bearing member in the structure shown in FIG. 2 to ensure ventilation between the fifth gap serving as a lubricating fluid reservoir and its exterior.

The vent 207 formed by a notch as shown in FIGS. 2A-2B and the through-hole 301 shown in FIGS. 3A-3B can be so small as to prevent any leakage of the lubricating fluid, since it is sufficient for them to have a size ensuring the filling of the bearing with the lubricating fluid and its ventilation. This feature is beneficial for suppressing the vaporization of the lubricating fluid.

The structure shown in FIGS. 2A-2B or 3A-3B in which the vent for ensuring ventilation between the fifth gap 215 and its exterior is narrowed is more advantageous for preventing the leakage and vaporization of the lubricating fluid than the structure shown in FIGS. 1A-1C, but the possibility of narrowing it is limited, since too narrow a vent makes it difficult to fill the fifth gap 215 with the lubricating fluid during the assembly of the bearing. A structure solving that problem will now be described.

Figure 4A:
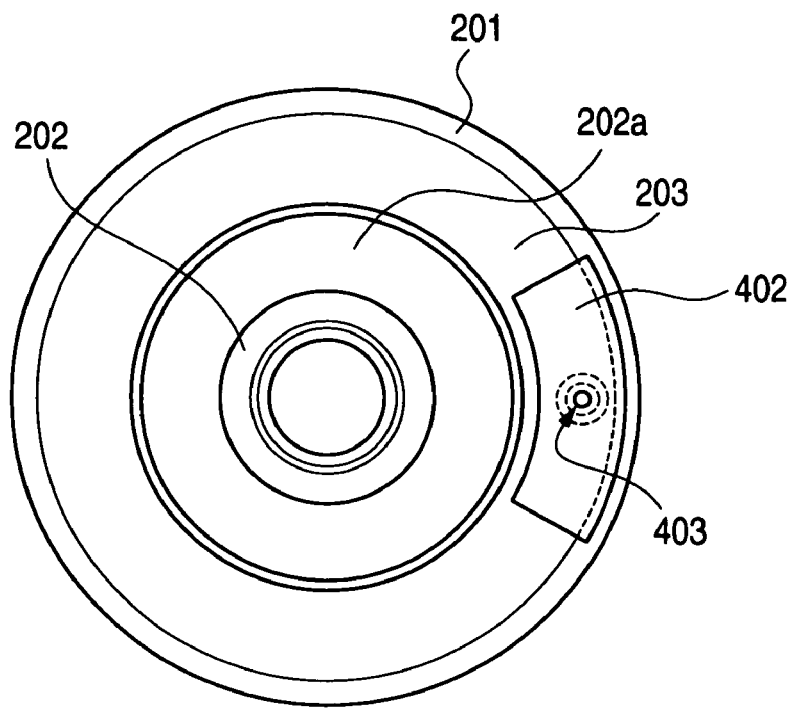
FIG. 4A is a top plan view and FIG. 4B is a cross-sectional view showing another modified form of the fluid dynamic bearing according to the second exemplary embodiment of the present invention.
Figure 4B:
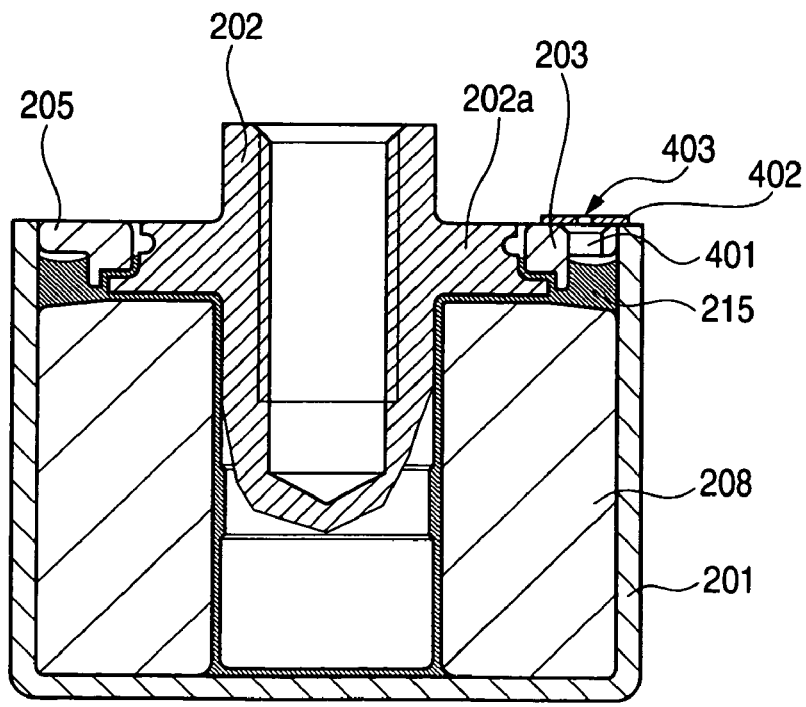

FIG. 4A is a top plan view showing another example of fluid dynamic bearing embodying an exemplary embodiment of the present invention as an improvement over the structure shown in FIGS. 2A-2B or 3A-3B, and FIG. 4B is a cross-sectional view corresponding to FIG. 4A. According to the improved structure, the annular member 203 on the bearing member has a vent 401 formed by a notch or through-hole in its large diameter portion 205 and the vent 402 is used for filling the bearing with the lubricating fluid during its assembly. The vent 401 may have an open area which is larger than that of the vent 207 in FIGS. 2A-2B or the through-hole 301 in FIGS. 3A-3B, to thereby realize an improved efficiency in the filling operation of the bearing with the lubricating fluid.

After the bearing has been filled with the lubricating fluid, a sealing (or cover) member 402 having a through-hole 403 formed therein for ventilation is fixed over the vent 401 to close the vent 401 except at the through-hole 403 formed in the sealing member. As it is sufficient for the through-hole 403 for ventilation to be so sized as to permit ventilation and have an open area which is smaller than that of the vent 207 or the through-hole 301, it is possible to ensure its function as a vent for enabling the movement of the lubricating fluid from the fifth gap 215 without any problem and also a good efficiency in the filling operation of the bearing with the lubricating fluid, as well as an improved function in preventing leakage and vaporization. The annular member 203 on the bearing member can be secured to the housing 201 indirectly by means of a separate member instead of being directly fitted on the inner periphery of the housing 201.

3. Third Embodiment

Figure 5:
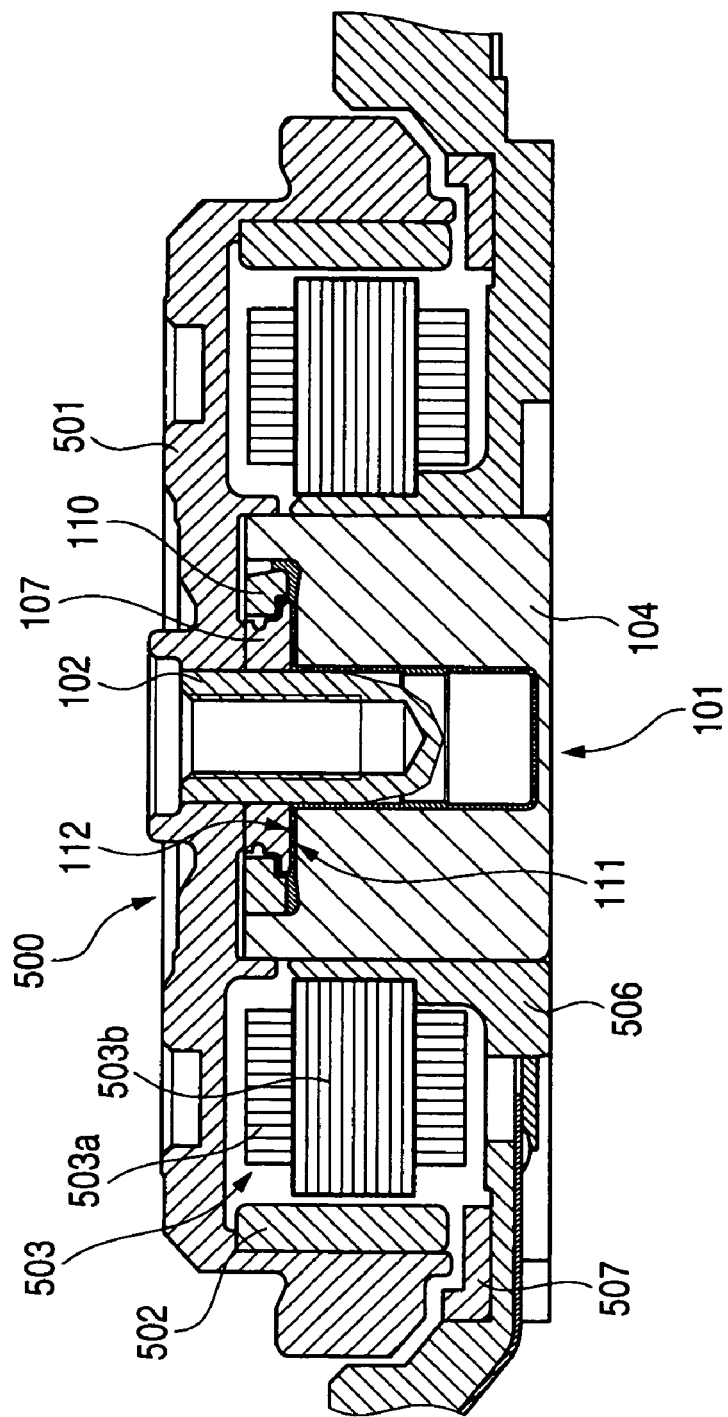
FIG. 5 is a cross-sectional view, partly in section, of a spindle motor according to a third exemplary embodiment of the present invention.

The fluid dynamic bearings shown in FIGS. 1A to 4C are applicable to spindle motors. Description will now be made of a spindle motor including the fluid dynamic bearing shown in FIGS. 1A-1C. FIG. 5 is a cross-sectional view of a spindle motor embodying an exemplary embodiment of the present invention.

The spindle motor 500 shown in FIG. 5 has a basic structure including a fluid dynamic bearing 101 in which a shaft member assembly composed of a shaft member 102 and an annular member 107 on the shaft member which is fitted about the shaft member 102 is supported rotatably by a lubricating fluid in a bearing member assembly composed of a bearing member 104 and an annular member 110 on the bearing member which is fitted in the bearing member 104, and a rotor 501 supported rotatably relative to a stator 503 by the fluid dynamic bearing.

The rotor 501 is secured to the shaft member 102 by press fitting and bonding. The rotor 501 has an annular permanent magnet 502 disposed on its inner periphery and the stator 503 fitted about the protruding portion 506 of a base 607 to be described later faces the permanent magnet 502 in a slightly spaced apart relation thereto. The stator 503 has a stator coil 503a and a stator core 503b.

When a driving current is supplied from a driving circuit not shown to the stator coil 503a, a magnetic interaction works between the stator 503 and the permanent magnet 502 and when the driving current supplied to the stator coil 503a is appropriately switched by the driving circuit not shown, the rotor 501 is rotated about the stator 503. The rotation of the rotor 501 about the stator 503 is supported by the fluid dynamic bearing 101.

An annular attracting plate 507 formed from a magnetic material is situated below the permanent magnet 502 in a slightly spaced apart relation thereto. The attracting plate 507 cooperates with the permanent magnet 502 in exerting an urging force to draw the rotor 501 as a whole toward the stator 503. This urging force keeps a balance with the axial dynamic pressure generated between the surface 111 of the bearing member 104 at one end thereof and the surface 112 of the annular member 107 on the shaft member at the other end thereof to ensure the stable rotation of the fluid dynamic bearing 101.

As the surface of generation of an axial dynamic pressure on the shaft member assembly in the fluid dynamic bearing shown in FIG. 1 is limited to the surface 112 of the annular member 107 on the shaft member at the other (or lower) end, thereof, a bearing for generating an urging force in the direction opposite that in which the axial dynamic pressure as stated above acts, to keep a balance with the axial dynamic pressure to thereby realize the stable rotation of the rotor. Thus, it is preferable to dispose a bearing for generating a magnetic attracting force in the direction opposite that of the axial dynamic pressure subjected to an axial load, to keep a balance between that magnetic force and the dynamic pressure generated by an axial dynamic pressure groove to support the rotor, The fluid dynamic bearing as herein disclosed is strong against impact and vibration and has a long life when it is embodied in a structure of small thickness and size. Accordingly, the fluid dynamic bearing according to the present invention is suitable for a spindle motor used in an environment in which problems of impact and vibration are likely to occur.

4. Fourth Embodiment

Figure 6:
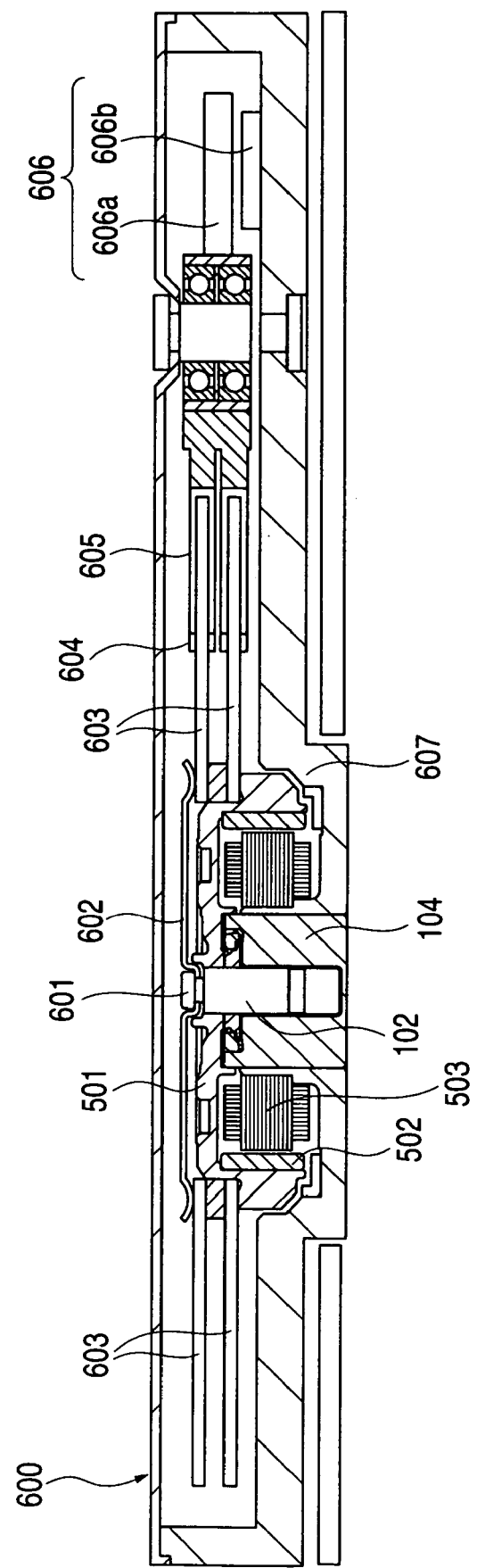
FIG. 6 is a cross-sectional view of a hard disk drive as an example of storage disk device according to a fourth exemplary embodiment of the present invention.

The spindle motor as described above is suitable as a device for driving a storage disk device. The following description is directed to a hard disk drive as an example of storage disk device. FIG. 6 is a cross-sectional view of a hard disk drive embodying an exemplary embodiment of the present invention.

The hard disk drive shown in FIG. 6 has the spindle motor shown in FIG. 5, two hard disks 603 secured to the rotor 501 of the spindle motor, magnetic heads 604 for writing and reading information in the hard disks 603, arms 605 supporting the magnetic heads and a voice coil motor 606 for driving the arms 605.

In the example shown, the hard disk drive 600 has a base 607 serving also as the base of the spindle motor shown in FIG. 5 and a clamp member 602 is threadedly connected to the shaft member 102 by a fix screw 601 to hold the hard disks 603 against the rotor 501.

When a driving current is supplied to the stator 503 to cause a magnetic interaction to work between the stator 503 and the permanent magnet 502, the rotor 501 is rotated relative to the base 607 of the hard disk drive 600 to rotate the hard disks 603 secured to the rotor 501.

With the rotation of the hard disks 603, a driving current is supplied to a coil 606a forming the voice coil motor 606 and causes a magnetic interaction to work between the coil 606a and a magnet 606b to drive the arms 605. As a result, the magnetic heads 604 at the ends of the arms 605 are moved to a specific position on the surfaces of the hard disks 603 to write and/or read information in the hard disks 603.

Mobile devices having a large storage capacity in spite of their small size and light weight have already been developed by installing small and thin hard disk drives in mobile devices, such as portable hard disk drives, portable computers, cellular phones or portable music players. These mobile devices are required to be stronger against vibration and impact to withstand use under conditions making them liable to vibration or impact, as by a person in a train, a person riding on a bicycle or a walking person. The hard disk drive described above is suitable for any such mobile device, since its driving unit for rotating the hard disks employs the fluid dynamic bearing which has a long life and is strong against impact and vibration.

5. Test Examples

Figure 7A:
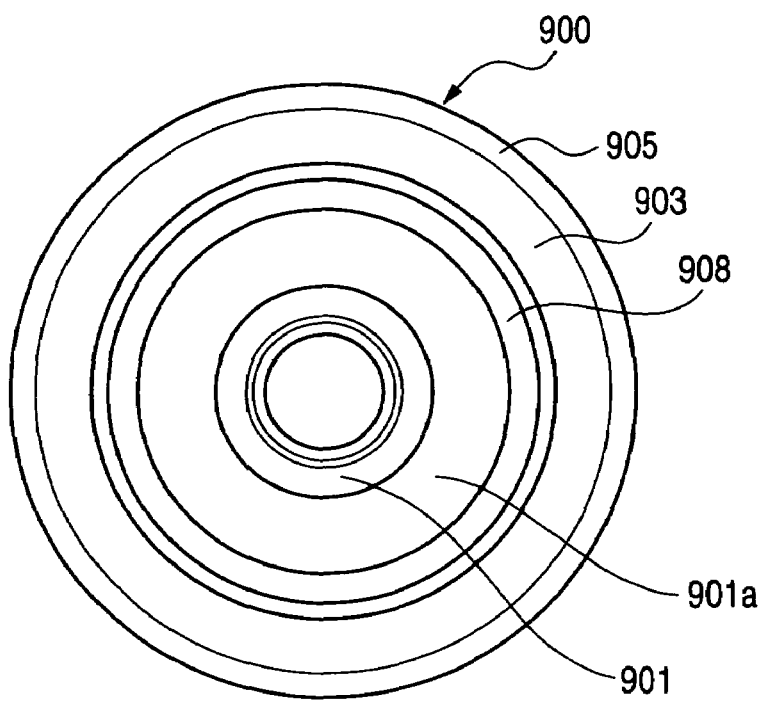
FIG. 7A is a top plan view and FIG. 7B is a cross-sectional view showing an example of fluid dynamic bearing known in the background art.
Figure 7B:
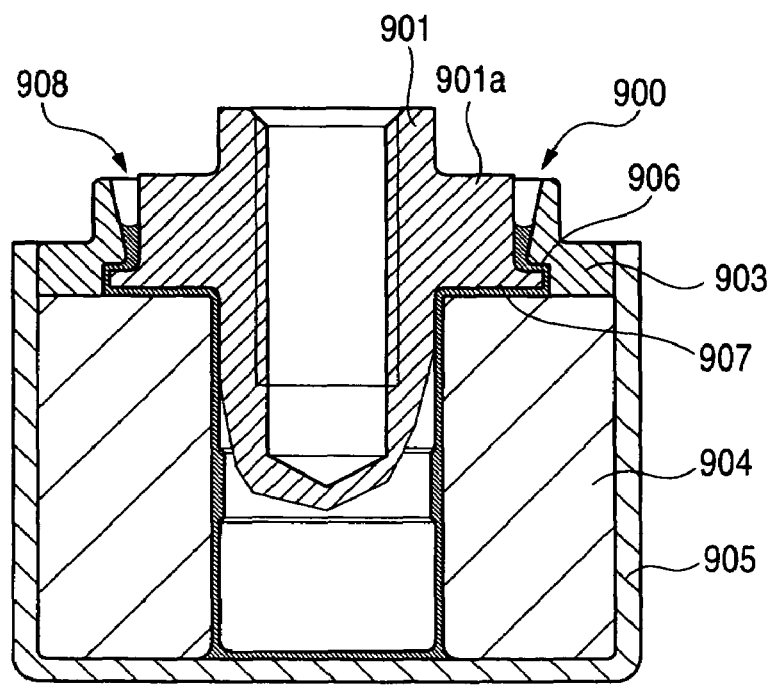
Figure 8:
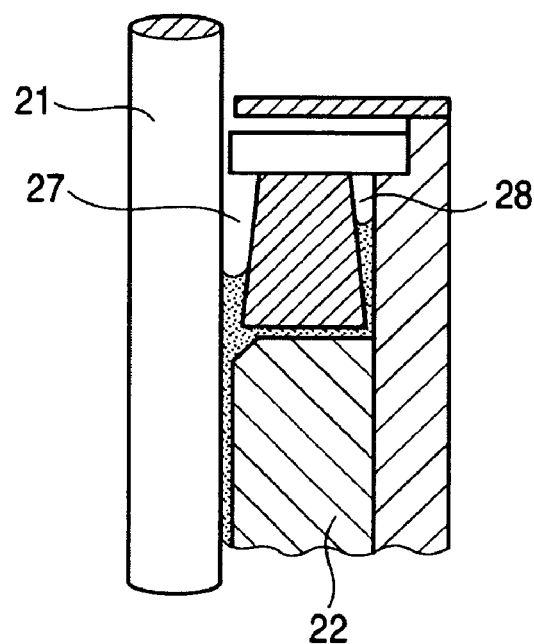
FIG. 8 is a detailed view showing an example of seal structure in the fluid dynamic hearing known in the background art.

Test samples were prepared by adopting the fluid dynamic bearing shown in FIGS. 1A-1C as Sample 1 of application of the present invention and the fluid dynamic bearing shown in FIGS. 3A-3B as Sample 2. Each of Samples 1 and 2 had an outside diameter of 2.5 mm for its shaft member, a maximum diameter of 5.1 mm for the annular member on the shaft member; an overall outside diameter of 7.2 mm and an overall height of 7.2 mm and was filled with a lubricant. In Sample 1 of application of the present invention (see FIGS. 1A-1B), each of the vents 118 formed by notches had a width of 0.3 mm and a length of 2 mm and in Sample 2, the through-hole 301 had a diameter of 0.35 mm. An oil repellent was applied to coat the surfaces around the vents 118 and the through-hole 301 and inside the holdback cavities 121 and 217 for receiving the lubricating fluid. As a comparative example, a Sample of prior-art structure having the structure shown in FIG. 7 was prepared by employing the same materials and dimensions as the Samples of application of the present invention. Each of these Samples was installed in a spindle motor as shown in FIG. 6 and impact and vibration tests were conducted thereon.

Description will first be made of the impact test. The impact test was conducted by leaving at a standstill each sample installed in a spindle motor, giving an impact thereto and checking it for any leakage of the lubricating fluid. A visual inspection was made through an optical microscope to check if there was any leakage of the lubricating fluid.

The impact was given by a Model SM-110-MP impact tester of AVEX for a period of 1 ms with a half-sine waveform at a maximum acceleration rate of 1,000 or 1,200 G Each spindle motor was tested in three positions, upward-facing, downward-facing and sideways-facing. Upward-facing means the position in which that side of the bearing member of the fluid dynamic bearing wherein the openings are formed (for example, that side in which the vents 118 and the gap opening 120 are formed in FIG. 1) faces upward, downward-facing means the position that such side faces downward, and sideways-facing means the position that such side faces horizontally. The impact was applied vertically downwardly. The tests were conducted by applying first a small impact (1,000 G) and then a large impact (1,200 G). The positions were changed in the order of upward-facing, downward-facing and sideways-facing for the tests at each acceleration rate. Accordingly, an impact of 1,000 G was applied to each sample in its upward-facing, downward-facing and sideways-facing positions, and followed by an impact of 1,200 G applied to each sample in its upward-facing, downward-facing and sideways-facing positions, making a total of six times of impact application. The impact was applied in the order as stated to produce progressively more severe conditions for testing the positional stability of the lubricating fluid subjected to impact.

The test results are shown in Table 1 below. In Table 1, "OK" means that there was no leakage of the lubricating fluid, "leakage" means that the leakage of the lubricating fluid was verified in the test, and "–" means that no test was conducted, since the leakage of the lubricating fluid had already been verified in a prior test.

TABLE 1

|  | Test position | 1,000 G | 1,200 G |
|---|---|---|---|
| Sample 1 of application of invention | Upward-facing | OK | OK |
|  | Downward-facing | OK | OK |
|  | Sideways-facing | OK | OK |
| Sample 2 of application of invention | Upward-facing | OK | OK |
|  | Downward-facing | OK | OK |
|  | Sideways-facing | OK | OK |
| Sample of prior-art structure | Upward-facing | OK | — |
|  | Downward-facing | Leakage | — |
|  | Sideways-facing | — | — |

As is obvious from Table 1, no leakage of the lubricating fluid from the Samples of application of the present invention was revealed by any impact test, while the impact of 1,000 G caused the leakage of the lubricating fluid from the prior-art structure. The advantages of the Samples of the present invention as revealed were apparently due to the fact that, as the lubricating fluid stored in the fifth gap 123 (in the structure of FIG. 1) or 215 (in the structure of FIG. 3) was easily movable to and from the seal (for example, the third gap 114 in FIG. 1), the lubricating fluid could move quickly between the fifth gap 123 or 215 and the seal in response to any sudden variation in width of the seal when subjected to impact and thereby any elevation or reduction of pressure at any part of the seal and any leakage caused by an unbalance in pressure were avoided.

While the condition of 1,000 G has been the conventional level of impact strength conventionally required for, for example, spindle motors used in hard disk or CD-ROM drives of notebook computers, recent mobile devices are required to withstand an impact exceeding 1,000 G. Accordingly, the fluid dynamic bearings withstanding an impact of 1,200 G as shown in Table 1 are suitable for spindle motors for mobile devices of which a still further reduction in size and a still further improvement in portability are required, and which are expected to be used under conditions making them more liable to impact, as in a train.

Description will now be described of the vibration test. The vibration test was conducted on the samples prepared in the same way as for the impact test. Each spindle motor including a sample to be tested was left stationary, given a vibratory load and checked for any leakage or splashing) of the lubricating fluid. The vibration test was conducted by the application of random vibration because it was considered to reproduce more accurately any vibration experienced in actual transport or use. A Model DCS-7800 vibration tester of EMIC was used to apply vibration under conditions including (1) a vibration frequency varying in a random way within the range of 5 to 500 Hz for each test, (2) three different levels of effective acceleration i.e., 5, 6 or 7 Grms for each test position and (3) a test time of 30 minutes for each test. The effective acceleration corresponds to the root-mean-square (rms) of acceleration according to Annex B2.5 to Standard JIS-C0036 expressed in unit G.

In a conventional vibration test, the absence of any leaking lubricating fluid during at least 10 minutes under random vibration at 4 Grms is considered sufficient. Therefore, the vibration test described above imposes very stringent conditions.

The vibration test for each sample was conducted by placing the fluid dynamic bearing in its upward-facing position and imparting thereto random vibration at an effective acceleration changed in sequence of 5, 6 and 7 Grms, then placing the fluid dynamic bearing in its downward-facing position and imparting thereto random vibration at an effective acceleration changed in sequence of 5, 6 and 7 Grms, and finally placing the fluid dynamic bearing in its sideways-facing position and imparting thereto random vibration at an effective acceleration changed in sequence of 5, 6 and 7 Grms. Each test also included visual inspection through an optical microscope to check the leakage (or splashing) of any lubricating fluid. The test results are shown in Table 2 below. The expressions used in Table 2 are as explained in connection with Table 1.

TABLE 2

|  | Test position | 5 Grms | 6 Grms | 7 Grms |
|---|---|---|---|---|
| Sample 1 of application of invention | Upward-facing | OK | OK | OK |
|  | Downward-facing | OK | OK | Leakage |
|  | Sideways-facing | OK | OK | — |
| Sample 2 of application of invention | Upward-facing | OK | OK | OK |
|  | Downward-facing | OK | OK | OK |
|  | Sideways-facing | OK | OK | OK |
| Sample of prior-art structure | Upward-facing | OK | — | — |
|  | Downward-facing | Leakage | — | — |
|  | Sideways-facing | — | — | — |

As is obvious from Table 2, Sample 1 of application of the present invention could withstand 30 minutes of a random vibration test at 6 Grms, and Sample 2 thereof 30 minutes of a random vibration test at 7 Grms. These results show that their performance was high enough to surpass the prior-standard for acceptance calling for the absence of any leaking lubricating fluid lasting during 10 minutes in a random vibration test at 4 Grms. The Sample of prior-art structure satisfied the prior-art requirement, but caused the leakage of the lubricating fluid in the 5 Grms vibration test conducted in its downward-facing position, as shown in Table 2. It, therefore, follows that the Sample could hardly withstand the vibration test conditions shown in Table 2.

The good test results of Sample 2 according to the present invention and having the structure shown in FIG. 3 were apparently due to the presence of the circumferentially extending second and third gaps 212 and 213, the latter serving as the seal, surrounded by the likewise circumferentially extending fifth gap 215 serving as the reservoir and surrounding the likewise circumferentially extending fourth gap 214, which facilitated a quick supply of the lubricating fluid in every radial direction to the seal and prevented the generation of bubbles effectively.

On the other hand, Sample 1 according to the present invention and having the structure shown in FIG. 1 was somewhat inferior to Sample 2 in test results presumably due to its inferiority to the structure shown in FIG. 3 in the ability to supply the lubricating fluid to the seal quickly, insofar as the lubricating fluid was supplied from the fifth gap 123 at the four vents 118 to the circumferentially extending second and third gaps 113 and 114, the latter serving as the seal.

Another reason for the good test results of Sample 2 according to the present invention and having the structure shown in FIG. 3 as compared with Sample 1 having the structure shown in FIG. 1 was presumably that the through-hole 301 was the only vent for the fifth gap 215 in the structure shown in FIG. 3 and had so small an open area that hardly any lubricating fluid could leak therethrough.

The present invention is applicable to a fluid dynamic bearing, a spindle motor including a fluid dynamic bearing, a storage disk device including a spindle motor, a mobile device including a storage disk device, etc.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims aye to be embraced within their scope.

The present application claims foreign priority based on Japanese Patent Application No. JP2005-306405 filed on Oct. 20, 2005, the contents of which is incorporated herein by reference.

What is claimed is:

1. A fluid dynamic bearing comprising:
a shaft member;
a bearing member spaced apart from the shaft member by a first gap;
a flange disposed on the shaft member, the flange having a first large diameter portion and a first small diameter portion on an outer periphery thereof and in this order from a second axial side toward a first axial side of the shaft member opposite to the second axial side;
an annular member fixed to the bearing member, the annular member having a second large diameter portion and a second small diameter portion on an inner periphery thereof, the second large diameter portion and the second small diameter portion facing the first large diameter portion and the first small diameter portion, respectively; and
a lubricating fluid,
wherein
a first axial side-end of the bearing member and a second axial side-end of the flange define a second gap therebetween, the second gap communicating with the first gap;
the flange and the annular member define a third gap therebetween;
the first axial side-end of the bearing member and a second axial side-end of the annular member define a fourth gap therebetween;
the annular member faces a fifth gap on an outer periphery thereof, the fifth gap communicating with the second and third gaps through the fourth gap and communicating with a vent ensuring ventilation toward an outside of the fluid dynamic bearing; and
the lubricating fluid fills the first to fifth gaps continuously so as to have a fluid surface thereof located in the third and fifth gaps.

2. The fluid dynamic bearing according to claim 1, wherein the fifth gap has a tapered shape enlarged toward the first axial side.

3. The fluid dynamic bearing according to claim 1, wherein the fourth gap has a tapered shape enlarged radially outwardly.

4. The fluid dynamic bearing according to claim 1, wherein the lubricating fluid has a higher surface level in the third gap than that in the fifth gap.

5. The fluid dynamic bearing according to claim 1, wherein the third gap includes an opening toward the outside, and an oil repellent is applied around the opening.

6. The fluid dynamic bearing according to 1, wherein an oil repellent is applied around the vent.

7. A fluid dynamic bearing comprising:
a shaft member;
a bearing member spaced apart from the shaft member by a first gap;
a flange disposed on the shaft member, the flange having a first large diameter portion and a first small diameter portion on an outer periphery thereof and in this order from a second axial side toward a first axial side of the shaft member opposite to the second axial side;
an annular member fixed to the bearing member, the annular member having a second large diameter portion and a second small diameter portion on an inner periphery thereof, the second large diameter portion and the second small diameter portion facing the first large diameter portion and the first small diameter portion, respectively; and
a lubricating fluid,
wherein a first axial side-end of the bearing member and a second axial side-end of the flange define a second gap therebetween, the second gap communicating with the first gap; the flange and the annular member define a third gap therebetween; the first axial side-end of the bearing member and a second axial side-end of the annular member define a fourth gap therebetween;
the annular member faces a fifth gap on an outer periphery thereof, the fifth gap communicating with the second and third gaps through the fourth gap and communicating with a vent ensuring ventilation toward an outside of the fluid dynamic bearing; and
the lubricating fluid fills the first to fifth gaps continuously so as to have a fluid surface thereof located in the third and fifth gaps; and
wherein the annular member has a third large diameter portion and a third small diameter portion on the outer periphery thereof, the third large diameter portion is fitted at an inner periphery of a bottomed cylindrical structure including the bearing member, and the fifth gap is defined by an outer periphery of the third small diameter and an inner periphery of the bottomed cylindrical structure.

8. The fluid dynamic bearing according to claim 7, wherein the third large diameter portion has at least one slot or through-hole as the vent.

9. The fluid dynamic bearing according to claim 7, wherein the third large diameter portion has a sealing member covering the vent and having a through-hole having an open area which is smaller than that of the vent, the fifth gap communicating with the outside through the through-hole of the sealing member.

10. The fluid dynamic bearing according to claim 9, which is coated with an oil repellent along the fifth gap around the vent or the through-hole of the sealing member communicating with the fifth gap.

11. A motor comprising a fluid dynamic bearing according to claim 1.

12. A storage disk device comprising: a motor according to claim 11; a storage disk medium rotated by the motor; and a head for at least one of writing information in the storage disk medium and reading the information.

13. The fluid dynamic bearing of claim 1, wherein the third gap includes a cavity expanding radially outward from a first vertical section of the third gap and extending within the first small diameter portion.

* * * * *